Feb. 11, 1958  R. E. MAYO  2,823,081
MASTER TRACK PIN
Filed June 29, 1956
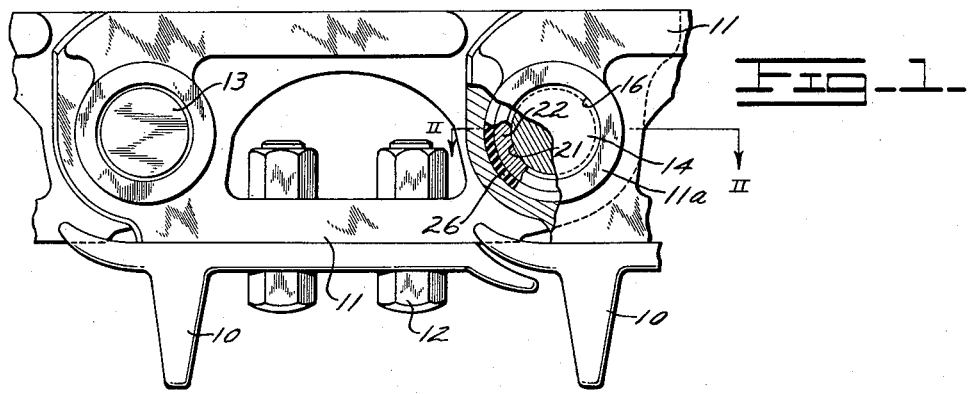
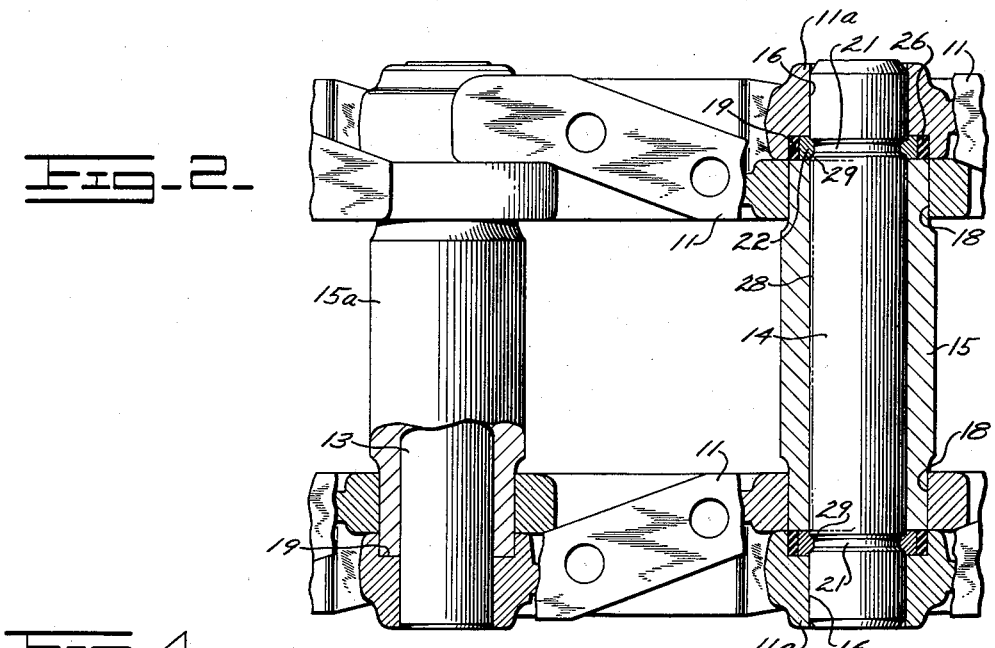
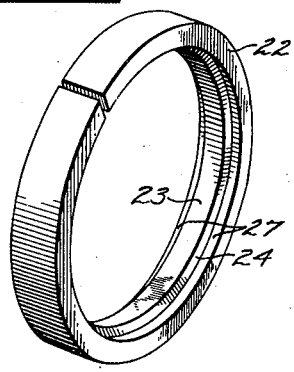
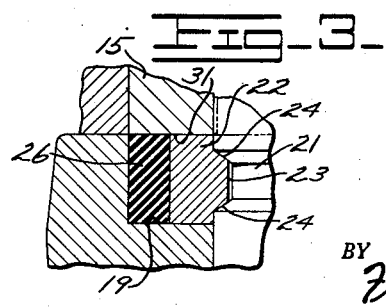
INVENTOR.
Roy E. Mayo
BY
*Fryer and Johnson*
ATTORNEYS

United States Patent Office 2,823,081
Patented Feb. 11, 1958

2,823,081

MASTER TRACK PIN

Roy E. Mayo, Peoria, Ill., assignor to Caterpillar Tractor Co., Peoria, Ill., a corporation of California Application June 29, 1956, Serial No. 594,835

6 Claims. (Cl. 305—10)

This invention relates to master pins or removable pins of the type used in chains, track-type tractor tracks and other articulated devices. The invention is particularly adapted for use with the articulated endless track of a track-type vehicle and will be described by reference to such use herein, though its adaptability to other similar uses will be made apparent as the description proceeds.

An endless track for track-type vehicles comprises a plurality of track shoes carried by links which are pivotally connected by means of pins. It is conventional practice to provide at least one master pin in the track assembly having suitable means for retaining it securely in place and still permitting removal of the pin for disassembly of the endless track from the vehicle. In the past, master pin connections have been found to be but partially effective since due to the severe strains and stresses on the components of the pin, master pins presently being used are either ineffective to remain securely in place or, on the other hand, will corrode within the connection making it difficult to remove when service to the track assembly is required. Moisture and abrasive matter entering between the hinge connection of the master pin corrodes the pin securely within the links of the chain rendering the connection unserviceable with the usual mechanic's tools.

The present invention comprises a master pin connection wherein registering key formations between the master pin and the track links retain the pin securely under ordinary stress and load conditions but the configuration of the key formations are such as to permit disassembly of the master pin from the connection with relative ease.

It is, therefore, an object of the present invention to provide a master pin of solid construction and of relative low cost for an endless track which is extremely simple to install and remove without resorting to the use of special tools. A further object of this invention is to provide sealing means acting between the hinged parts, which relatively completely fills the void in the hinge connection to restrict the entry of moisture and abrasive matter into the area. Further objects and advantages of the invention are made apparent in the following specification wherein a preferred form of the invention is descirbed in detail by references to the accompanying drawings.

In the drawings:

Fig. 1 is a view in side elevation of an endless track assembly showing the master pin connection with parts broken away to show the details thereof;

Fig. 2 is a plan view of the same with parts broken away and with the master pin assembly shown in section taken along the lines II—II of Fig. 1;

Fig. 3 is an enlarged sectional view of a portion of the master pin connection illustrating the keying means and the manner in which the key registers with an annular recess in the pin; and Fig. 4 is an isometric view of the retaining means illustrating the manner in which the keying portion thereof is developed.

Referring to the drawings in detail, the track assembly illustrated in Fig. 1 comprises a plurality of ground engaging plates or track shoes 10 each of which are rigidly secured to a pair of spaced parallel interconnected track links 11 as by bolts 12. Each pair of track links 11 is pivotally connected by means of track pins 13 to an adjacent and cooperating pair of links in such a manner that an articulated chain is formed. The end links of this chain are, according to this invention, connected by means of a master pin shown at 14 forming the endless track chain which is adapted to be trained over a drive sprocket and an idler sprocket, not shown, as is customary in track-type vehicles. It is to the construction of the master pin assembly that this invention is particularly directed.

As seen in Fig. 2, the master pin 14 extends through suitable openings 16 provided in a portion 11a of the adjacent set of track links 11 to form a pivotal connection between the links or adjacent track shoes. A track pin bushing 15, the ends of which are secure within a suitable opening 18 in one pair of said track links 11 is disposed about the track pin 14 and serves as a spacer between said links 11. The bushing 15 also acts as a bearing in which the track pin 14 may oscillate. In the conventional connection, the bushing shown at 15a extends beyond the links 11 into a suitable counterbore 19 machined in the portion 11a of the outer links. However, in the master pin assembly the track pin bushing is flush with the links 11 so as to admit the entry of the chain assembly between the portions 11a of the adjacent links. The master track pin is formed of a solid cylindrical member having at least one annular recess 21, two being shown in the present case, provided in its periphery so as to register with the counterbores 19 when it is in its assembled position. Contained within the void provided by the counterbore 19 is a retaining device in the form of a solid resilient snap ring 22 which normally tends to close around and engage the recess 21. Referring to Fig. 4, the snap ring 22 has an internal key formation 23 presenting walls 24 obliquely disposed with relation to the cylindrical surface of the key. The annular recesses in pin 14 are likewise provided with walls of matching incline, the purpose of which will be presently described.

As shown in Fig. 3, the cross sectional area of the snap ring occupies but a portion of the area of the counterbore 19 permitting outer radial movement of the ring 22 to permit entry of pin 14 whenever the master pin connection is to be assembled. The angular faces 24 of the ring 22 and the matching angularity formed in annular recess 21 provide for ease in distorting the ring 22 whenever the master connection is to be disassembled.

In order to seal against the entry of moisture and abrasive material into the area of the master pin connection, a resilient annular sealing member 26 is contained in the area defined between the outer perimeter of snap rings 22 and the radial wall of the counterbore 19, relatively completely filling the void therebetween. In the assembled condition, the captive condition of the seal 26 offers axial thrust against the ends 31 of the sleeve 15 sealing the connection. In the preferred form disclosed in the drawings, the ring 22 also contacts the end of the sleeve 15 so as to keep the track components in respective spaced relationship and to further seal against the entry of foreign particles into the area of the pin connection. The key formation 23 shown in Fig. 4 is of shorter axial length than that of the snap ring 22 so as to provide axially extending flange portions 27 which have the following advantage. Normally, most of the wear in a hinge connection of this type occurs between the pin 14 and the cylindrical wall of the sleeve 15. This is indicated by the necessity to adjust the spring tension of the track tensioning mechanism in order to compensate for elongation of the track assembly which is caused by wear in each link connection. The master pin is also subject to wear because of the relative movement of the sleeve. The flanges 27 formed in the snap ring 22 indent the key formation with relation to the line defined by the end of the sleeve 15 so that under a condition of wear, indicated in broken lines as at 28, a peripheral flange 29 is defined adjacent the annular recess to restrict the snap ring from moving axially inwardly along the master pin and retain the pin 14 secure within the track assembly.

From the foregoing it is apparent that the track pin assembly of the present invention consists of very few simple, durable and readily assembled and disassembled parts with provisions to minimize damage resulting from moisture and abrasives present in the environment in which the apparatus operates. With the openings in the links and bushing 15 aligned and the snap rings 22 and resilient member 26 in place the master pin may be driven into position. It may as easily be removed by a driving force since the matching inclined surfaces at 24 will cause the rings to expand when such force is applied.

I claim:

1. A hinge connection comprising two parts connected for relative swinging movement by a pin, a spacing element embracing the pin to space said parts axially along the pin, a counterbore in one of said parts, an annular recess in said pin and retaining means disposed within said counterbore and registering with said annular recess to retain said pin in assembly.

2. A hinge connection comprising two parts connected for relative swinging movement by a pin, a spacing element embracing the pin to space said parts axially along the pin, a counterbore in one of said parts, an annular recess in said pin retaining means disposed within said counterbore and registering with said annular recess and a resilient filler member occupying the space between the retaining means and the counterbore to seal against the entry of foreign material into the hinge connection.

3. A hinge connection comprising two parts connected for relative swinging movement by a pin, a spacing element embracing the pin to space said parts axially along the pin, an annular counterbore in one of said parts, an annular recess in said pin and retaining means disposed within said counterbore, said retaining means having a circumferential tapered key formation registering with said annular recess and a resilient filler member occupying the space between the retaining means and the counterbore to seal against the entry of foreign material into the hinge connection.

4. A hinge connection comprising two parts connected for relative swinging movement by a pin, a spacing element embracing the pin to space said parts axially along the pin, an annular counterbore in one of said parts, an annular recess in said pin and retaining means within said counterbore, said retaining means comprising a circumferential tapered key formation registering with said annular recess, said recess having tapered walls substantially matching the taper of said key formation, and a resilient filler member occupying the space between the retaining means and the counterbore to seal against the entry of foreign material into the hinge connection.

5. For combination with an endless track or the like which includes spaced links with aligned apertures for the reception of a track pin, a sleeve connecting one set of said links to maintain their relative spacing, a counterbore in each of the other links, a master pin extending through said sleeve and apertures in said links, the improvement which comprises said pin being formed with an annular recess so as to register with said counterbore when the pin is in its assembled position, retaining means contained within said counterbore in register with said annular recess, said means comprising a formation thereon co-acting with the annular recess in said pin to cause displacement of the retaining means when the pin is forced axially from the assembly.

6. For combination with an endless track or the like which includes spaced links with aligned apertures for the reception of a track pin, a sleeve connecting one set of said links to maintain their relative spacing, a counterbore in each of the other links, a master pin assembly comprising a master pin extending through said sleeve and apertures in said links, the improvement which comprises said pin being formed with an annular recess so as to register with said counterbore when the pin is in its assembled position, retaining means contained within said counterbore in register with said annular recess, said retaining means comprising a formation thereon co-acting with the annular recess in said pin to cause displacement of the retaining means when the pin is forced axially from the assembly, and means interposed between said retaining means and the counterbore relatively completely filling the void therebetween to prevent the entry of foreign material into the area of the pin.

References Cited in the file of this patent

UNITED STATES PATENTS

| | | |
|---|---|---|
| 1,237,814 | Porter et al. | Aug. 21, 1917 |
| 2,699,974 | Deffenbaugh | Jan. 18, 1955 |
| 2,719,063 | Dearlove | Sept. 27, 1955 |